United States Patent
Robinson et al.

(10) Patent No.: US 11,631,224 B2
(45) Date of Patent: Apr. 18, 2023

(54) 3D IMMERSIVE VISUALIZATION OF A RADIAL ARRAY

(71) Applicant: HEWLETT-PACKARD DEVELOPMENT COMPANY, L.P., Houston, TX (US)

(72) Inventors: Ian N. Robinson, Palo Alto, CA (US); Mithra Vankipuram, Palo Alto, CA (US); Siddharth Raja, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 304 days.

(21) Appl. No.: 16/075,643

(22) PCT Filed: Nov. 21, 2016

(86) PCT No.: PCT/US2016/063094
§ 371 (c)(1),
(2) Date: Aug. 4, 2018

(87) PCT Pub. No.: WO2018/093391
PCT Pub. Date: May 24, 2018

(65) Prior Publication Data
US 2019/0051058 A1     Feb. 14, 2019

(51) Int. Cl.
*G06T 19/20*     (2011.01)
*G06F 3/00*      (2006.01)
(Continued)

(52) U.S. Cl.
CPC ............... *G06T 19/20* (2013.01); *G06F 3/00* (2013.01); *G06F 3/012* (2013.01); *G06F 3/04815* (2013.01); *G06T 2219/2016* (2013.01)

(58) Field of Classification Search
CPC ...... G06F 3/041; G06F 3/012; G06F 3/04815; G06F 3/011; G06F 3/00; G06T 15/00; G06T 19/20; G06T 2219/2016
See application file for complete search history.

(56) References Cited

U.S. PATENT DOCUMENTS 7,532,230 B2    5/2009    Culbertson et al.
8,583,615 B2 *  11/2013   White .................... G06F 16/40
                                                              707/705
(Continued)

FOREIGN PATENT DOCUMENTS

WO    2013111145 A1    8/2013

OTHER PUBLICATIONS

Raja et al., "Exploring the Benefits of Immersion in Abstract Information Visualization", In Proceedings of Immersive Projection Technology Workshop, Retrieved from Internet: http://people.cs.vt.edu/bowman/papers/ipt_dheva.pdf, Apr. 28, 2004, 7 pages.

*Primary Examiner* — Matthew Ell
*Assistant Examiner* — Kenny Nguyen
(74) *Attorney, Agent, or Firm* — Quarles & Brady LLP

(57) ABSTRACT

A method, according to one example, includes receiving, by a system including a processor, a three-dimensional (3D) data array defined in a 3D rectangular coordinate space. The method includes transforming, by the system, the 3D data array into a radial array defined in a spherical coordinate space. The method includes generating, by the system, a 3D immersive visualization of the radial array in which a user appears to be immersed within the radial array. The method includes continually modifying the 3D immersive visualization based on movement of the user.

11 Claims, 9 Drawing Sheets

(51) Int. Cl.
  *G06F 3/01*      (2006.01)
  *G06F 3/04815*   (2022.01)

(56) References Cited

U.S. PATENT DOCUMENTS

| | | | |
|---|---|---|---|
| 8,624,924 B2 | 1/2014 | Dobbins et al. | |
| 9,268,812 B2* | 2/2016 | White | G06F 16/24 |
| 9,798,461 B2* | 10/2017 | Lee | G06F 3/04815 |
| 9,830,351 B2* | 11/2017 | White | G06F 16/40 |
| 9,998,659 B2* | 6/2018 | Bassi | H04N 5/23238 |
| 10,127,637 B2* | 11/2018 | Kim | G06T 5/002 |
| 2006/0238442 A1 | 10/2006 | Uhlhorn et al. | |
| 2008/0276201 A1* | 11/2008 | Risch | G06F 16/34 |
| | | | 715/853 |
| 2009/0063414 A1* | 3/2009 | White | G06F 3/0484 |
| 2009/0083396 A1* | 3/2009 | Roos | G06F 3/167 |
| | | | 709/219 |
| 2010/0128112 A1 | 5/2010 | Marti et al. | |
| 2011/0193939 A1* | 8/2011 | Vassigh | G06F 3/017 |
| | | | 348/46 |
| 2012/0324401 A1* | 12/2012 | Morris | G06F 3/04815 |
| | | | 715/836 |
| 2013/0097563 A1* | 4/2013 | Pacheco Rodrigues Velho | |
| | | | G06F 3/04815 |
| | | | 715/850 |
| 2013/0154913 A1 | 6/2013 | Gene et al. | |
| 2013/0218688 A1* | 8/2013 | Roos | G06F 3/04815 |
| | | | 705/14.69 |
| 2014/0032181 A1 | 1/2014 | Arrighi | |
| 2014/0059430 A1* | 2/2014 | White | G06F 3/04817 |
| | | | 715/716 |
| 2014/0098186 A1* | 4/2014 | Seidl | G06F 3/011 |
| | | | 348/36 |
| 2014/0125774 A1* | 5/2014 | Lee | H04N 5/217 |
| | | | 348/47 |
| 2014/0189512 A1* | 7/2014 | White | G06F 16/24 |
| | | | 715/716 |
| 2014/0267233 A1* | 9/2014 | Lee | G06F 1/1694 |
| | | | 345/419 |
| 2014/0267277 A1* | 9/2014 | Mcnerney | G06T 13/20 |
| | | | 345/426 |
| 2014/0282266 A1* | 9/2014 | Brown | G06F 3/04847 |
| | | | 715/848 |
| 2014/0368606 A1* | 12/2014 | Bassi | H04N 13/305 |
| | | | 348/36 |
| 2015/0113483 A1* | 4/2015 | Van Der Westhuizen | |
| | | | G06F 3/04842 |
| | | | 715/850 |
| 2015/0277699 A1* | 10/2015 | Algreatly | G02B 27/017 |
| | | | 715/850 |
| 2015/0294275 A1* | 10/2015 | Richardson | G06F 16/26 |
| | | | 705/7.18 |
| 2016/0180512 A1* | 6/2016 | Myers | G06T 11/00 |
| | | | 345/419 |
| 2018/0007389 A1* | 1/2018 | Izumi | H04N 19/167 |
| 2018/0061011 A1* | 3/2018 | Kim | G06T 7/11 |
| 2018/0122042 A1* | 5/2018 | Kim | G06F 3/0346 |
| 2018/0130243 A1* | 5/2018 | Kim | G06F 3/4038 |
| 2018/0241986 A1* | 8/2018 | Zhong | G06T 19/20 |
| 2019/0246095 A1* | 8/2019 | Kishimoto | G02B 27/0172 |

* cited by examiner

3D IMMERSIVE VISUALIZATION OF A RADIAL ARRAY

BACKGROUND

A data collection that includes data records can be visualized in a graphical visualization. In the graphical visualization, graphical elements can represent various attributes of the data records. A graphical visualization can be a two-dimensional (2D) or three-dimensional (3D) visualization.

DETAILED DESCRIPTION

Figure 1:
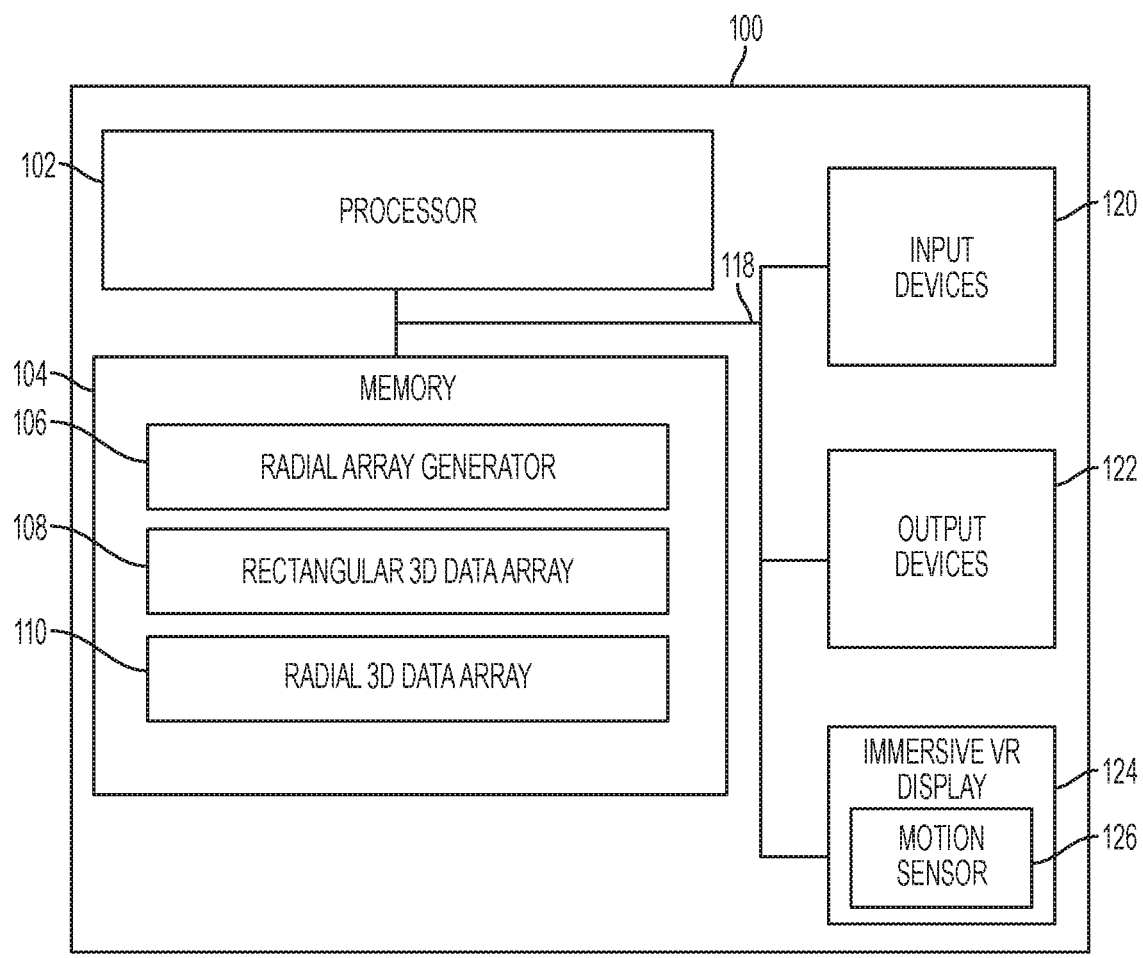
FIG. 1 is a block diagram illustrating one example of a system for generating a 3D immersive display of a radial array.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Data records in a data collection can have a relatively large number of different attributes. Examples of data records include files, documents, objects (e.g., images, video data, etc.), user feedback comments on websites, and so forth. As examples, data records pertaining to employees of an enterprise (e.g., business concern, educational organization, government agency, etc.) can include the following attributes: employee name, employee number, department the employee works for, employee position, social security number, salary, number of years employed, employee ranking, geographic region, and other attributes. As another example, data records pertaining to operation of an information technology (IT) system of an enterprise can include the following attributes: processor utilization, network utilization, storage utilization, device temperature, applications used, detected faults or errors, geographic region, and other attributes. As a further example, data records pertaining to sales activities of an enterprise can include the following attributes: product name, service name, state, country, sales amount, profit, cost, vendors, customer sentiment, and other attributes. There can be numerous other examples of attributes, including structured and unstructured attributes, in other types of data records.

Visualization tools often allow for visualization of a relatively small number of attributes, based on the general assumption that users know what attributes are of interest and can thus select a subset of attributes to represent in a visualization. However, this may not be true in many cases, particularly for a data collection that includes a large number of attributes. In such cases, it may be beneficial to visualize a larger number of attributes concurrently, so that users can discover trends, patterns, or anomalies, which can then be used to determine which subset of attributes is of interest.

In accordance with some implementations, visualization techniques or mechanisms are provided to allow for visualization of a larger number of attributes simultaneously so that users are presented with more information than provided by visualizations that are able to represent a smaller number of attributes. In this way, users are able to more easily detect patterns, trends, or anomalies, and can thus better focus on (and select) attributes that can allow the users to determine a cause of such patterns, trends, or anomalies. The visualization techniques or mechanisms according to some implementations are able to visualize the larger number of attributes with reduced or minimal occlusion of graphical elements representing data records of a data collection.

Some examples are directed to a visualization process that generates a visualization that includes a multidimensional array of multidimensional graphlets (e.g., three-dimensional or 3D graphlets). The multidimensional (e.g., 3D) array arranges the 3D graphlets in multiple dimensions (e.g., three dimensions).

A 3D graphlet is a graphical element that has multiple (e.g., at least three) dimensions. For example, the 3D graphlet can have a height dimension, a width dimension, and a depth dimension. More generally, a multidimensional graphlet can represent more than three dimensions. As examples, in addition to the height dimension, width dimension, and depth dimension, a multidimensional graphlet can have further dimension(s), such as a color, a shape, motion, and so forth. Although reference is made in the present disclosure to 3D graphlets, it is noted that "3D graphlet" is intended to refer to either a 3D shape that can represent one or more dimensions of data. Although a graphlet may be a 3D shape, it may be used to represent, for instance, a single data value (e.g., represented by the height of a vertical box).

The visualization process may represent respective attributes of data records with the dimensions of the 3D array. These attributes may be split into independent variables (e.g. country, year) and dependent variables (e.g. profit, cost). The dimensions of the array represent the first set of attributes, the independent variables. In some examples, the attributes of the first set can include categorical attributes. A categorical attribute is an attribute that has multiple categorical values. An example of a categorical attribute is a country attribute, where the different values of the country attribute represent different countries (which are examples of different categories). In other examples, the attributes of the first set can include discrete numerical attributes (e.g., dates and years). A discrete numerical attribute is an attribute that can have different discrete numerical values from across a range of values. In some cases, the attributes of the first set can include both categorical and discrete numerical attributes.

The visualization process may represent respective additional dependent attributes of the data records with the dimensions of the 3D graphlets. The dependent attributes are part of a second set of attributes that are distinct from the first set of attributes (i.e., the attributes of the first set can be completely distinct from the attributes of the second set). The attributes of the second set can include categorical attributes and/or numerical attributes. In other examples, the first set and the second set of attributes may overlap.

Visualizing large data sets is useful in many applications, enabling users to rapidly identify patterns and anomalies in their data. The recent advent of wide field of view (FOV), low cost, head-mounted displays with accurate, low-latency position and orientation tracking, present a new method of immersing a user in a large data set, potentially improving their ability to navigate and explore the data.

Some examples are directed to a method for adapting 3D data visualizations to immersive displays. The method allows a rectangular x,y,z 3D data visualization to be represented as a radial array spatial arrangement for viewing and navigation in an immersive system (such as a head-mounted display). The radial array appears to radiate from the user's viewpoint and fill the user's field of view. In some examples, the method is designed to dynamically respond to viewer position and orientation changes in a way that is both intuitive and minimizes occlusions and some of the perspective effects that can be confusing to the viewer in a 3D data visualization. In some examples, the 3D arrangement of the data is altered in response to head movements of the viewer to create a stereo image free from occlusions but still updated in an intuitive manner.

An immersive display or an immersive environment according to some examples disclosed herein provides a virtual reality experience in which a user feels immersed within the data visualization, and provides: a high level of interaction and display fidelity; a high level of responsiveness to human interaction; the ability to take advantage of the visual perception system of a user; and the ability to allow users to interact with the system in a natural way.

FIG. 1 is a block diagram illustrating one example of a system 100 for generating a 3D immersive display of a radial array. System 100 includes at least one processor 102, a memory 104, input devices 120, output devices 122, and an immersive virtual reality (VR) display 124. Processor 102, memory 104, input devices 120, output devices 122, and immersive display 124 are communicatively coupled to each other through communication link 118.

Processor 102 includes a Central Processing Unit (CPU) or another suitable processor. In one example, memory 104 stores machine readable instructions executed by processor 102 for operating system 100. Memory 104 includes any suitable combination of volatile and/or non-volatile memory, such as combinations of Random Access Memory (RAM), Read-Only Memory (ROM), flash memory, and/or other suitable memory. These are examples of non-transitory computer readable media. The memory 104 is non-transitory in the sense that it does not encompass a transitory signal but instead is made up of at least one memory component to store machine executable instructions for performing techniques described herein.

Memory 104 stores radial array generator module 106, rectangular 3D data array 108, and radial 3D data array 110. Processor 102 executes instructions of radial array generator module 106 to transform the rectangular 3D data array 108 into the radial 3D data array 110, which is then displayed on immersive display 124. Immersive display 124 includes a motion sensor 126 to detect head movement and/or eye gaze of a viewer, and modifies the display of the radial 3D data array 110 based on the detected information.

Input devices 120 include a keyboard, mouse, data ports, and/or other suitable devices for inputting information into system 100. Output devices 122 include speakers, data ports, and/or other suitable devices for outputting information from system 100.

In the following description, a non-immersive graphical visualization is described with respect to FIG. 2, followed by a description with respect to FIGS. 3-9 of techniques that may be used by system 100 to adapt such a visualization to an immersive environment.

Figure 2:
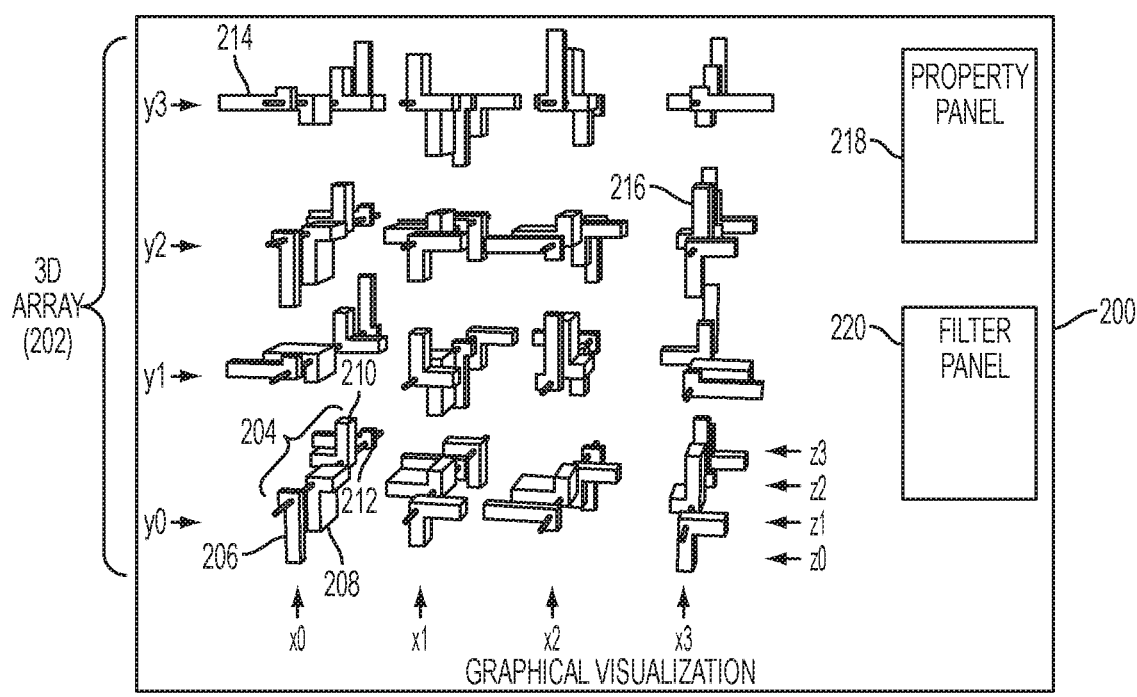
FIG. 2 is a schematic diagram of an example non-immersive graphical visualization of a three-dimensional (3D) array of 3D graphlets, in accordance with some implementations.

FIG. 2 depicts an example non-immersive interactive graphical visualization 200 that includes a 3D array 202 of 3D graphlets. The graphlets are arranged in three dimensions of the 3D array 202, where the three dimensions of the 3D array 202 can represent an x attribute, a y attribute, and a z attribute, respectively. In the example shown in FIG. 2, the three dimensions represent respective attributes of the data records that are represented by the 3D graphlets. The y dimension of the 3D array represents y attributes that have the following y attribute values: y0, y1, y2, and y3. The x dimension of the 3D array represents x attributes that have the following x attribute values: x0, x1, x2, and x3. The z dimension of the 3D array represents z attributes that have the following z attribute values: z0, z1, z2, and z3.

In the ensuing discussion, reference is made to the graphlets along the z dimension as being a row of graphlets (e.g., row 204 shown in FIG. 2). More generally, graphlets along any of the dimensions (x, y, z) can be referred to as a line of graphlets along the respective dimension.

In the example of FIG. 2, the row 204 of graphlets include graphlets 206, 208, 210, and 212, where each graphlet is a 3D graphical element that represents at least three data attribute dimensions via its height, width, and depth. The graphlet 206 represents a data record that has an x attribute with value x0, a y attribute with value y0, and a z attribute with value z0. The graphlet 208 represents a data record that has an x attribute with value x0, a y attribute with value y0, and a z attribute with value z1.

The different orientations of the L-shaped 3D graphlets in FIG. 2 can indicate whether the values of the horizontal (x) and vertical (y) attributes are positive or negative. Thus, if both horizontal and vertical values are positive, a graphlet will have an "L" orientation. However, if the horizontal value is negative, a graphlet will have a "J" orientation.

Other orientations of graphlets may correspond to other combinations of positive and negative values.

In other examples, adjacent 3D graphlets can provide different representations. For example, a 3D graphlet at a first position may represent a visualization of a first subset of attributes, while a 3D graphlet at a neighboring position may represent a visualization of a second, different subset of attributes (where the second subset can overlap or not overlap with the first subset).

Other graphlets assigned reference numerals in FIG. 2 include a graphlet 214 (which represents a data record having an x attribute with value x0, a y attribute with value y3, and a z attribute with value z0), and a graphlet 216 (which represents a data record having an x attribute with value x3, a y attribute with value y2, and a z attribute with value z1).

Different characteristics of each 3D graphlet can represent a respective different dimension of data records in a data collection. The different characteristics can include the three dimensions of the 3D graphlet. For example, the height dimension of the 3D graphlet can represent a first attribute, the width dimension of the 3D graphlet can represent a second attribute, and the depth dimension of the 3D graphlet can represent a third attribute. In addition, the 3D graphlet can have another characteristic, such as its color or shape that can represent yet a further attribute of a data record represented by the 3D graphlet. In some examples, the space allotted to each 3D graphlet in the visualization is fixed. As a result, as part of the process of generating the graphlets, the attribute values can be scaled as they are mapped to the graphlet properties (e.g., width, height, etc.) so that the maximum and minimum values in the data just fit within this allotted space. A similar process can be applied if the graphlet color is set to be a simple color ramp (e.g., between red and green) between minimum and maximum values for some other attribute.

A 3D graphlet is a graphical element that can encode a number of different attributes of data. For example, the width, height, depth, and color of the graphical element can represent four respective attributes of data. If graphlet motion is used, potentially more attributes can be represented. In the example of FIG. 2, each 3D graphlet can represent four attributes of data. When combined with the three additional attributes that can be represented by the three dimensions of the 3D array 202, the graphical visualization 202 that includes the 3D array 202 of 3D graphlets can represent seven attributes of data, which can be visualized to allow users to identify patterns, trends, or anomalies in data.

In the interactive graphical visualization 200 of FIG. 2, a property panel 218 and a filter panel 220 can be included, in some examples. The property panel 218 can be used to display properties of a selected graphlet (or selected graphlets). A user can interact with the graphical visualization 200 by selecting one or multiple graphlets in the 3D array 202. In response to selection of the graphlet(s), properties of the selected graphlet(s) can be displayed in the property panel 218. For example, the property panel 218 can depict values of the various attributes of data represented by the selected graphlet(s).

The filter panel 220 includes control elements that are manipulatable by a user to control an appearance of the displayed 3D array 202 of graphlets. The appearance of the 3D array 202 of graphlets can include setting data bounds and thresholds on the mapping of the attribute values to graphlet properties. Instead of using the maximum and minimum values in the data to determine the scaling of the mappings to the graphlet attributes, the user can supply their own data bounds and thresholds, to reduce the impact of wildly anomalous data values, or to focus on particular value ranges in the data. The user can also select from different color mappings that can be used to highlight interesting characteristics of the data, e.g. deviation from an average value. The control of the appearance of the 3D array of graphlets can allow a user to emphasize particular events or patterns in the visualized data.

Figure 3A:
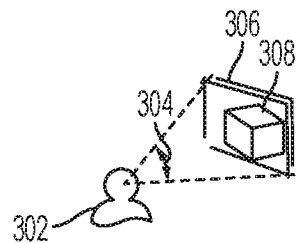
FIG. 3A is a diagram illustrating a 3D data visualization using a narrow FOV display screen according to one example.

3D data visualizations, such as that shown in FIG. 2, may be designed to be viewed on a screen occupying a narrow portion of the user's FOV—essentially rendering an object in front of the user that the user can examine from different directions. FIG. 3A is a diagram illustrating a 3D data visualization using a narrow FOV display screen 306. The display screen 306 is displaying a 3D data array object 308, and has a narrow FOV 304 (e.g., 30-40 degrees) from the viewpoint of the viewer 302.

Figure 3B:
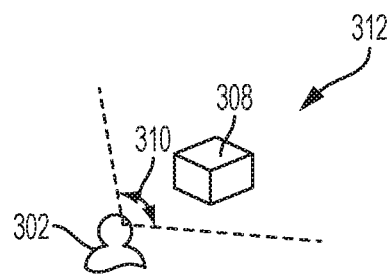
FIG. 3B is a diagram illustrating a 3D data visualization of the 3D object shown in FIG. 3A using an immersive display environment according to one example.

This approach does not translate well to an immersive display environment where the display resolution is spread out over a far wider field of view (e.g., 90 degrees or more). FIG. 3B is a diagram illustrating a 3D data visualization of the 3D object 308 shown in FIG. 3A using an immersive display environment 312 according to one example. The immersive display environment 312 includes a wide FOV (e.g., 90 degrees or more) 310 from the viewpoint of the user 302. As shown in FIG. 3B, simply rendering the original 3D object 308 in front of the viewer in the immersive display environment 312 results in a much lower resolution experience, as only the pixels in the original narrow FOV 304 (FIG. 3A) are used.

Figure 3C:
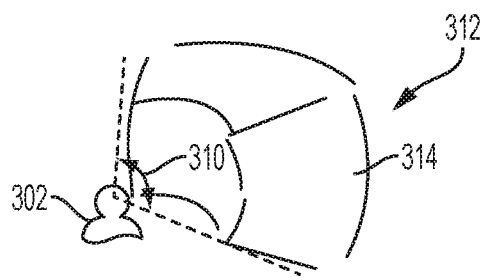
FIG. 3C is a diagram illustrating a 3D data visualization of a transformed version of the 3D object shown in FIG. 3A using an immersive display environment according to one example.

FIG. 3C is a diagram illustrating a 3D data visualization of a transformed version 314 of the 3D object 308 shown in FIG. 3A using an immersive display environment 312 according to one example. The immersive display environment 312 includes a wide FOV (e.g., 90 degrees or more) 310 from the viewpoint of the user 302. The transformed version 314 of the 3D object 308 (FIG. 3A) is displayed around the viewer 302, providing an intuitive spatial organization that can fill the viewer's FOV 310. In some examples, the display of the transformed version 314 prevents occlusion from being as big of an issue as in normal perspective views of a rectangular array. It also avoids some of the perspective effects that can be confusing in 3D data visualizations, such as cases in which elements at the same depth are seen at different angles depending on their x, y position. In some examples, the 3D object 308 is a rectangular 3D data array, and radial array generator module 106 (FIG. 1) generates the transformed version 314 by transforming the rectangular 3D data array into a radial 3D data array.

Figure 4A:
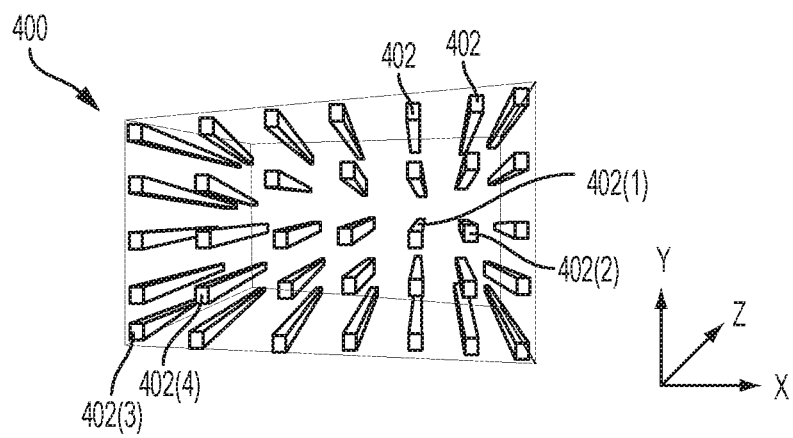
FIG. 4A is a diagram illustrating a 3D data visualization of a 3D data array with perspective effects.

FIG. 4A is a diagram illustrating a 3D data visualization of a 3D data array 400 with perspective effects. The 3D data array 400 includes a plurality of rows 402 of graphlets (e.g., a 5×7 array with 35 rows of graphlets). For simplicity, in FIGS. 4A and 4B, each row of 3D graphlets is shown as a single 3D block. As shown in FIG. 4A, because of the perspective view, the rows 402 are seen at different angles depending on their x, y position, which results in some rows 402 (e.g., rows 402(1) and 402(2)) with a limited visibility along the z-axis, and some rows 402 that occlude other rows 402 (e.g., row 402(4) partially occluding row 402(3)).

Figure 4B:
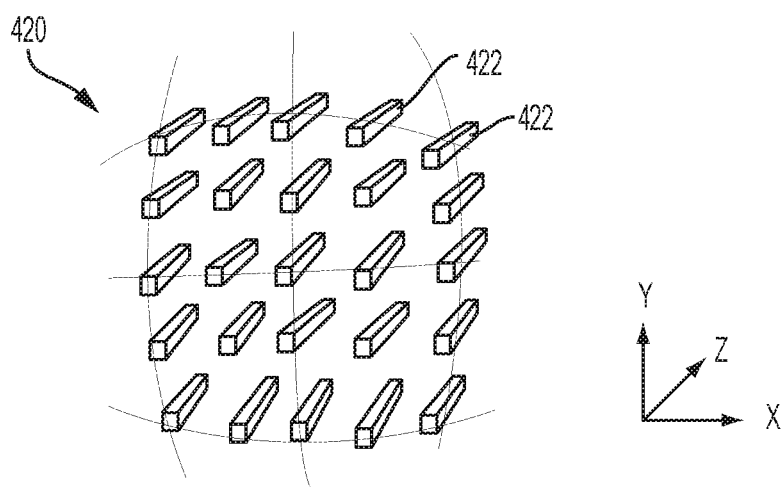
FIG. 4B is a diagram illustrating a 3D data visualization of a 3D data array that avoids the perspective effects shown in FIG. 4A according to one example.

FIG. 4B is a diagram illustrating a 3D data visualization of a 3D data array 420 that avoids the perspective effects shown in FIG. 4A according to one example. The 3D data array 420 includes a plurality of rows 422 of graphlets (e.g., a 5×5 array with 25 rows of graphlets). As shown in FIG. 4B, the rows 422 all appear to be at the same angle regardless of their x, y position, and all of the rows 422 are completely visible along the z-axis and do not occlude each other. In some examples, radial array generator module 106 (FIG. 1) generates 3D data visualizations, such as that shown in FIG. 4B, that avoid negative perspective effects.

To create an immersive visualization, a rectangular (x, y, z) 3D space is transformed by the radial array generator module 106 to a spherical polar-like (Lx, Ly, z) space surrounding the view position. A rectangular 3D coordinate system includes an x-axis, a y-axis, and a z-axis. It is assumed that the viewpoint of the viewer starts at (0,0,0)—looking along the z-axis in rectangular space. Mappings of the rectangular 3D coordinate system to values in a spherical coordinate system according to one example are as follows: (1) x in the rectangular coordinate system maps to ∠y in the spherical coordinate system, which represents rotation away from z=0 in the x direction (i.e., rotation about the y axis); (2) y in the rectangular coordinate system maps to ∠x in the spherical coordinate system, which represents rotation away from z=0 in the y direction (i.e., rotation about the x axis); and (3) z in the rectangular coordinate system maps to z in the spherical coordinate system.

Figure 5:
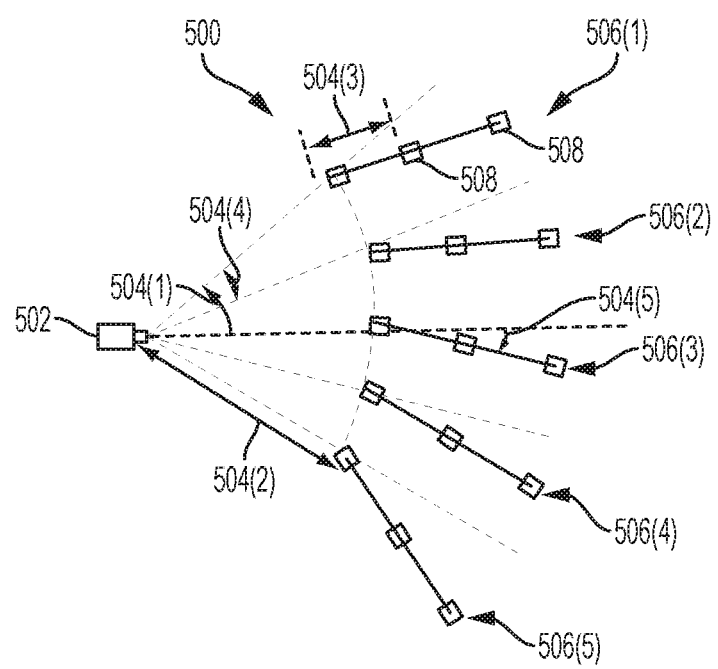
FIG. 5 is a diagram illustrating a radial array of 3D data according to one example.

FIG. 5 is a diagram illustrating a radial array 500 of 3D data according to one example. The radial array 500 is shown in two dimensions to simplify the illustration, and is viewed from the viewpoint of a viewer, which is represented by element 502. The radial array 500 includes five rows 506(1)-506(5) (collectively referred to as rows 506) of graphlets 508, where each row 506 includes three graphlets 508 (represented by rectangles) in the example. The radial array 500 is defined by parameters 504(1)-504(5). Parameter 504(1) actually includes two parameters (in 3D), which are starting angles away from the z axis rotating about the x and y axes, "vrStartX" and "vrStartY". Parameter 504(2) is a starting radius, "vrRadius". Parameter 504(3) is the pitch at which graphlets 508 are spaced along the rows 506. The "pitch" parameter 504(3) may be provided by the user. Parameter 504(4) is the angular separation between rows 506, "vrSeparationAngle". Parameter 504(5) is the tilt of each row 506 in x and y with respect to the view from the viewer 502, "vrTiltX" and "vrTiltY". If both vrTiltX and vrTiltY are 0, then the viewer 502 is looking end-on directly down the row. This may not be very useful, so the array 500 may be set up with a small initial tilt (e.g., about 5 degrees about both x and y axes).

Changes in head orientation of the viewer naturally map to rotating the element 502 at the center of this arrangement—for example letting the user see the whole breadth of the array 500 by turning their head from side to side (essentially substituting head rotation for panning (translating) in front of the rectangular array). The radial rearrangement shown in FIG. 5 removes the issue of occlusion for rows away from the current view direction.

Head position changes may be dealt with based on what a user would want to achieve by making those motions. For example, a user may shift the user's head to the right to get a perspective on the data ordered along the z-axis that is a little more of a three-quarter view from the right, or a user may move the user's head forward to get a closer look at the data. In either case (e.g., a shift in x,y; or a move in z), the desirable aspects of the radial array 500 (simple panning, lack of occlusion) are preserved by keeping the viewpoint at the center of the radial array 500, but changing the layout of the radial array 500 to simulate the view change due to the translational input.

Figure 6:
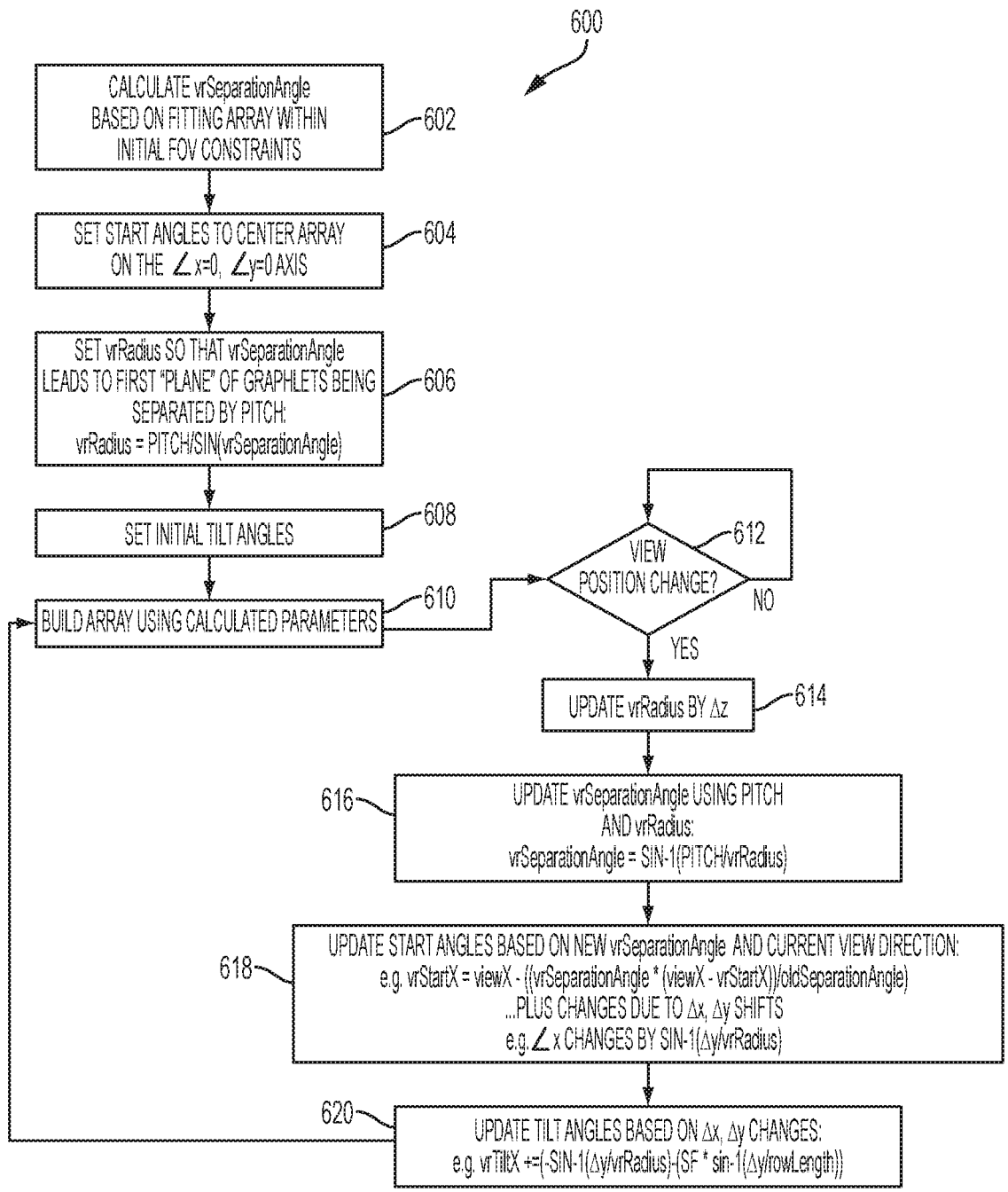
FIG. 6 is a flow diagram illustrating a method for calculating the parameters of the radial array shown in FIG. 5 and updating the parameters based on head movement according to one example.

FIG. 6 is a flow diagram illustrating a method 600 for calculating the parameters 504 of the radial array 500 shown in FIG. 5 and updating the parameters 504 based on head movement according to one example. In one example, system 100 (FIG. 1) performs method 600. It is noted that the pitch parameter 504(3) may be set by the user or system as a characteristic of the original rectangular layout.

At 602 in method 600, the separation angle parameter 504(4) ("vrSeparationAngle") is calculated by radial array generator 106 (FIG. 1) based on fitting the array within initial FOV constraints. At 604, the start angle parameters 504(1) ("vrStartX" and "vrStartY") are set to the center of the array on the ∠x=0, ∠y=0 axis by radial array generator 106. At 606, the starting radius parameter 504(2) ("vrRadius") is set by radial array generator 106 so that the separation angle parameter 504(4) ("vrSeparationAngle") leads to a first "plane" of graphlets being separated by the same distance as the pitch parameter 504(3): vrRadius=pitch/sin(vrSeparationAngle). At 608, the tilt parameters 504(5) ("vrTiltX" and "vrTiltY") are set to initial values by radial array generator 106, as discussed above. At 610, a radial array 500 is built by radial array generator 106 using the parameters 504 determined at 602-608.

At 612, the method 600 monitors head movement of the viewer (e.g., via motion sensor 126), and determines if the view position of the viewer has changed. If it is determined at 612 that the view position has changed, the method 600 moves to 614, where the radius parameter 504(2) ("vrRadius") is updated by an amount Δz by radial array generator 106. At 616, the separation angle parameter 504(4) ("vrSeparationAngle") is updated by radial array generator 106 based on the pitch parameter 504(3) ("pitch") and the radius parameter 504(2) ("vrRadius") as follows: vrSeparationAngle=sin-1(pitch/vrRadius). At 618, the start angle parameters 504(1) ("vrStartX" and "vrStartY") are updated by radial array generator 106 based on the updated separation angle parameter 504(4) ("vrSeparationAngle") (updated at 616), and based on the current view direction ("viewX") as follows: e.g., vrStartX=viewX−((vrSeparationAngle*(viewX−vrStartX))/oldSeparationAngle) . . . plus changes due to Δx, Δy shifts (e.g., Lx changes by sin-1(Δy/vrRadius). At 620, the tilt angle parameters 504(5) ("vrTiltX" and "vrTiltY") are updated by radial array generator 106 based on the Δx, Δy changes as follows: e.g., vrTiltX+=(−sin-1(Δy/vrRadius))−(SF*sin-1(Δy/row-Length), where SF=tilt scale factor.

Figure 7:
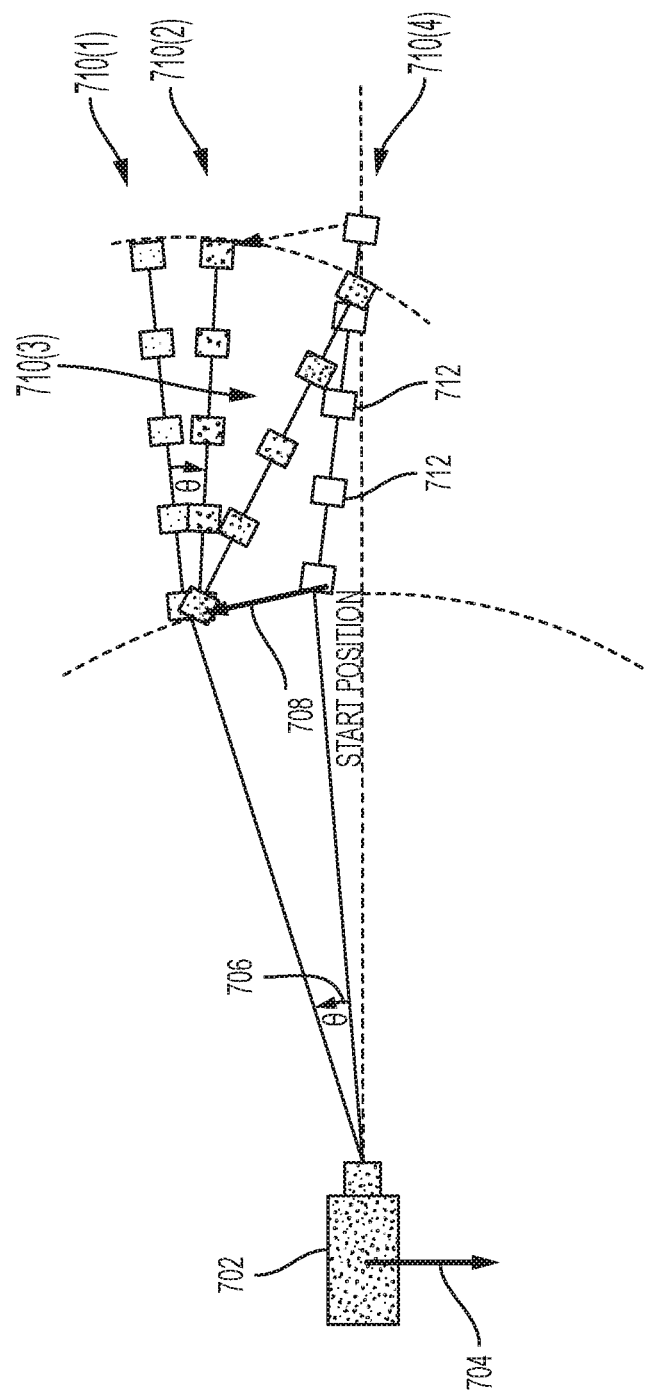
FIG. 7 is a diagram illustrating the change in the tilt angles of a row of a radial array in response to changes in head movement according to one example.

FIG. 7 is a diagram illustrating the change in the tilt angles ("vrTiltX" and "vrTiltY") of a row of a radial array in response to Δx, Δy changes in head movement, and the setting of the tilt scale factor, according to one example. Row 710(4) of the radial array includes five graphlets 712 (represented by rectangles), and represents an initial configuration of the row prior to the detection of head movement. Rows 710(1)-710(3) represent different possible movements of the row 710(4) based on detected head movement, including tilting of the row to simulate the shift in viewing angle. The radial array rows 710(1)-710(4) are shown in two dimensions to simplify the illustration, and are viewed from the viewpoint of a viewer, which is represented by element 702. Movement of the viewer's head is represented by viewer head translation vector 704. Based on detected head movement represented by vector 704, the radial array, including radial array row 710(4), is rotated by an angle (θ) 706. This results in a shift upward of the row 710(4), as represented by vector 708.

The tilt scale factor ("SF" in method 600) can be set from 0 to 1. Row 710(2) represents the movement of row 710(4)

using a tilt scale factor of 0. When the tilt scale factor is set to 0, there is no "depth perspective effect", and shifting of the viewer's head appears to rotate the array an appropriate amount (sin-1(shift/vrRadius)), and the front-most and rear-most graphlets 712 of each row appear to move by the same amount, as indicated by row 710(2). Row 710(3) represents the movement of row 710(4) using a tilt scale factor of 1. When the tilt scale factor is set to 1, additional tilt is added, and each row acts as though its far end is at infinite depth, so the far end appears stationary and does not appear to move with the head movement, as indicated by row 710(3). If there is no tilt change, the row 710(4) may appear as row 710(1).

Too much tilt could lead to a confusing layout. The amount of tilt can be limited to a maximum amount (e.g., 45 degrees) to limit how far a row can be tilted in x and/or y.

In some examples, the radial array is continually rebuilt around the current view direction (e.g., by adjusting the array start angles 504(1)), so the position of the object the user currently has in the center of their FOV does not appear to change.

In some examples, the radial array is modeled and rendered in a spherical coordinate space independent of the current view direction. In an alternative implementation, the spherical coordinate space can be relative to the view direction. In the first case, the array can be thought of as existing in the (virtual) world seen by the viewer, and in the second case, the array coordinate system is "attached" to the viewer's view direction. In the latter case, the array is updated based on viewer rotations to present the correct portion of the array in front of the viewer. An advantage of this technique is that there are no physical limits to the radial array. In particular the "poles" of the radial array are never visible, and there is no crowding of the data points as they are approached. Also, the array can appear to extend beyond 360 degrees.

Figure 8:
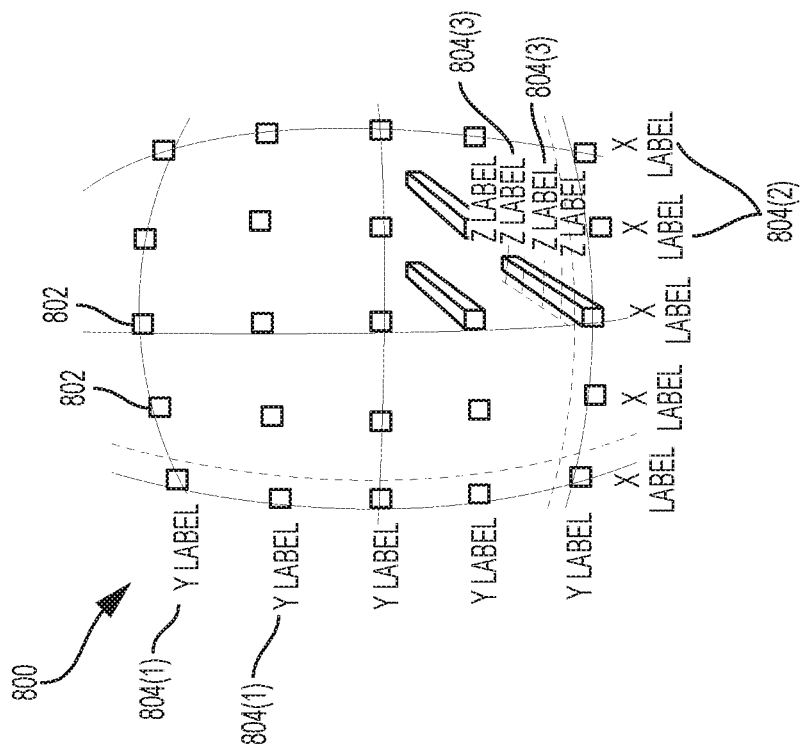
FIG. 8 is a diagram illustrating a data visualization that includes a radial array of 3D data with displayed labels according to one example.

In addition to rendering the radial array, the data visualization may also include a rendering of labels, and the axes for the x, y and z dimensions. FIG. 8 is a diagram illustrating a data visualization that includes a radial array 800 of 3D data with displayed axes and labels according to one example. The radial array 800 includes a plurality of rows 802 of graphlets. The labels include Y labels 804(1), X labels 804(2), and Z labels 804(3) (collectively referred to as labels 804). Each graphlet in the radial array 800 includes an associated Y label 804(1), an associated X label 804(2), and an associated Z label 804(3).

Figure 9:
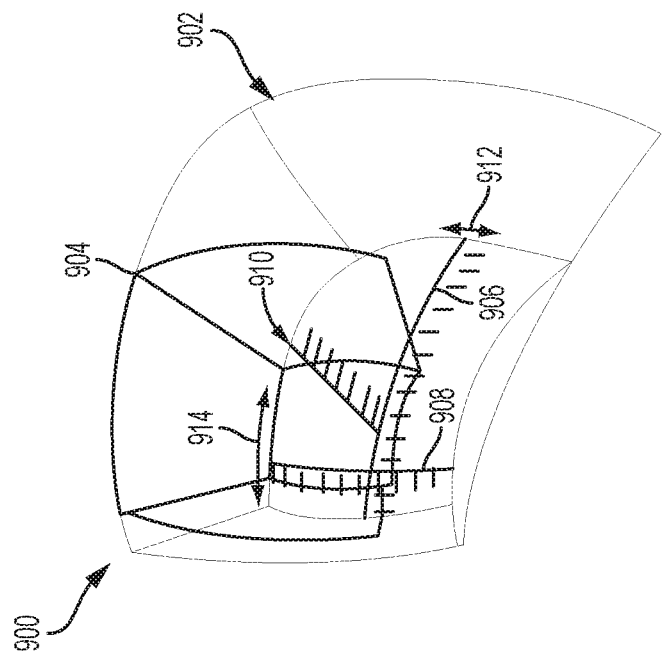
FIG. 9 is a diagram illustrating a data visualization that includes a radial array of 3D data with displayed axes according to one example.

FIG. 9 is a diagram illustrating a data visualization 900 that includes a radial array 902 of 3D data with displayed axes according to one example. The radial array 902 includes a portion 904 representing the portion of the radial array 902 currently within the FOV of the viewer. The displayed axes include an X axis 906, a Y axis 908, and a Z axis 910. The X axis 906 is anchored or pinned at or near the bottom edge of the current FOV portion 902, but moves up and down with movement of the FOV as indicated by arrow 912. The Y axis 908 is anchored or pinned at or near the left edge of the current FOV portion 902, but moves left and right with movement of the FOV as indicated by arrow 914. The Z axis 910 also moves with movement of the FOV. The axes 906, 908, and 910 can be provided in a heads-up display type of manner, where the labels 804 (FIG. 8) track the displayed graphlets and change as the FOV changes, but the axes 906, 908, and 910 are pinned to the edges of the FOV. It is noted that the view shown in FIG. 8 is essentially a close-up view of a portion of FIG. 9, and that the labels 804 shown in FIG. 8 are represented by hash marks along the axes 906, 908, and 910 in FIG. 9.

Figure 10:
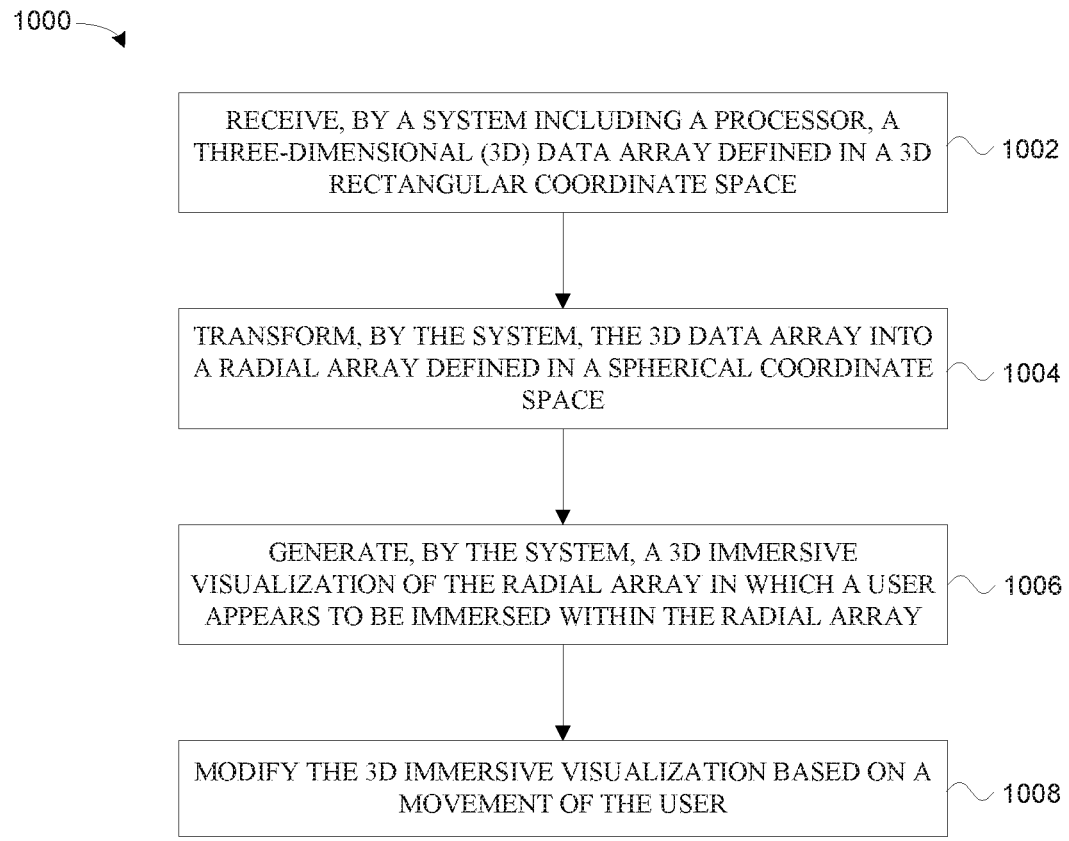
FIG. 10 is a flow diagram illustrating a method according to one example.

FIG. 10 is a flow diagram illustrating a method 1000 according to one example. At 1002 in method 1000, a system 100 including a processor 102 receives a three-dimensional (3D) data array 108 defined in a 3D rectangular coordinate space. At 1004, the system 1000 transforms the 3D data array into a radial array 110 defined in a spherical coordinate space. At 1006, the system generates a 3D immersive visualization of the radial array in which a user appears to be immersed within the radial array. At 1008, the 3D immersive visualization is modified based on a movement of the user.

Although some examples described herein relate to visualization techniques for graphlets in a 3D x,y,z rectangular array, the techniques described herein are applicable to other visualization types that exhibit a rectilinear structure. Examples disclosed herein may use virtual reality (VR) head mounted display (HMDs), or any other type of immersive display with head-tracking.

One example is directed to a method that includes receiving, by a system including a processor, a three-dimensional (3D) data array defined in a 3D rectangular coordinate space. The method includes transforming, by the system, the 3D data array into a radial array defined in a spherical coordinate space. The method includes generating, by the system, a 3D immersive visualization of the radial array in which a user appears to be immersed within the radial array. The method includes modifying the 3D immersive visualization based on a movement of the user.

In some implementations of the method, x coordinates in the rectangular coordinate space map to ∠y coordinates in the spherical coordinate space and represent rotation about a y axis, y coordinates in the rectangular coordinate space map to ∠x coordinates in the spherical coordinate space and represent rotation about an x axis, and z coordinates in the rectangular coordinate space map to z coordinates in the spherical coordinate space.

The radial array may be defined by a plurality of parameters that are updated based on the movement of the user. The parameters may include: a radius parameter that represents a distance between the user and the radial array; start angle parameters that represent starting angles of elements of the radial array away from a z-axis and rotating about x and y axes; an angular separation parameter that represents an angular separation between elements of the radial array from a viewpoint of the user; a pitch parameter that represents a distance between adjacent elements of the radial array; and tilt parameters that represent a tilt of lines of elements in the radial array in x and y dimensions from a viewpoint of the user.

The 3D immersive visualization may include a 3D array of multidimensional graphlets, wherein each of the multidimensional graphlets includes at least three dimensions. The method may further include: representing, by the system, respective attributes of data with dimensions of the 3D array of multidimensional graphlets; and representing, by the system, respective additional attributes of the data with dimensions of the multidimensional graphlets.

Another example is directed to a system, which includes at least one processor to: transform a three-dimensional (3D) data array defined in a 3D rectangular coordinate space into a radial array defined in a spherical coordinate space; generate a 3D immersive visualization of the radial array in which a user appears to be immersed within the radial array; detect movement of a user interacting with the 3D immersive visualization; and update the 3D immersive visualization based on movement of the user. The radial array may be defined by a plurality of parameters that are updated based on the movement of the user, wherein the parameters include tilt parameters that represent a tilt of lines of elements in the radial array in x and y dimensions from a viewpoint of the user.

Yet another example is directed to a non-transitory computer-readable storage medium storing instructions that, when executed by at least one processor, cause the at least one processor to: receive a three-dimensional (3D) data array defined in a 3D rectangular coordinate system; transform the 3D data array into a 3D radial array of multidimensional graphlets defined in a non-rectangular coordinate system; generate a 3D immersive visualization of the 3D radial array of multidimensional graphlets; and modify the 3D immersive visualization based on movement of a viewer of the visualization. Each of the multidimensional graphlets may include at least three dimensions, and attributes of data may be represented with dimensions of the 3D radial array, and additional attributes of the data may be represented with dimensions of the multidimensional graphlets.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method, comprising:
receiving, by a system including a processor, a three-dimensional (3D) data array defined in a 3D rectangular coordinate space, wherein the 3D data array includes a plurality of data records, wherein each of the data records includes a plurality of attributes, and wherein each of the three dimensions of the 3D data array represents one of the attributes of the data records;
transforming, by the system, the 3D data array including the plurality of data records with the plurality of attributes into a radial array representing the 3D data array and defined in a spherical coordinate space, wherein each of three dimensions of the radial array represents one of the attributes of the data records, and wherein the radial array is defined by a plurality of parameters;
generating, by the system, a 3D immersive visualization of the radial array in which a user appears to be immersed within the radial array and the radial array appears to radiate from a viewpoint of the user; and
updating the plurality of parameters and modifying the 3D immersive visualization based on a movement of the user, wherein the parameters include at least one first tilt parameter that represents a tilt of lines of elements in an x dimension of the radial array from the viewpoint of the user and at least one second tilt parameter that represents a tilt of lines of elements in a y dimension of the radial array from the viewpoint of the user, wherein initial values of the tilt parameters are set as non-zero values so that the user is not looking end-on directly down the lines of elements, wherein the parameters include a pitch parameter that represents a distance between adjacent elements of the radial array, wherein the pitch parameter is set as a characteristic of an original rectangular layout of the 3D data array, wherein the parameters further include a radius parameter that represents a distance between the user and the radial array, wherein a starting value of the radius parameter is set based on the pitch parameter, and wherein the starting value of the radius parameter is set to lead to a set of elements in the radial array being separated by a same distance as the pitch parameter.

2. The method of claim 1, wherein x coordinates in the rectangular coordinate space map to $\angle y$ coordinates in the spherical coordinate space and represent rotation about a y axis, and y coordinates in the rectangular coordinate space map to $\angle x$ coordinates in the spherical coordinate space and represent rotation about an x axis.

3. The method of claim 2, wherein z coordinates in the rectangular coordinate space map to z coordinates in the spherical coordinate space.

4. The method of claim 1, wherein the parameters include a radius parameter that represents a distance between the user and the radial array.

5. The method of claim 1, wherein the parameters include start angle parameters that represent starting angles of elements of the radial array away from a z-axis and rotating about x and y axes.

6. The method of claim 1, wherein the parameters include an angular separation parameter that represents an angular separation between elements of the radial array from a viewpoint of the user.

7. The method of claim 1, wherein the 3D immersive visualization includes a 3D array of multidimensional graphlets, wherein each of the multidimensional graphlets includes at least three dimensions.

8. The method of claim 7, wherein the method further comprises:
representing, by the system, respective attributes of data with dimensions of the 3D array of multidimensional graphlets; and
representing, by the system, respective additional attributes of the data with dimensions of the multidimensional graphlets.

9. A system comprising:
at least one processor to:
receive a three-dimensional (3D) data array defined in a 3D rectangular coordinate space;
transform the 3D data array defined in the 3D rectangular coordinate space into a radial array defined in a spherical coordinate space, wherein the 3D data array includes a plurality of data records, wherein each of the data records includes a plurality of attributes, wherein each of the three dimensions of the 3D data array represents one of the attributes of the data records and each of three dimensions of the radial array represents one of the attributes of the data records, and wherein the radial array is defined by a plurality of parameters;
generate a 3D immersive visualization of the radial array in which a user appears to be immersed within the radial array and the radial array appears to radiate from a viewpoint of the user;
detect movement of a user interacting with the 3D immersive visualization; and
update the plurality of parameters and the 3D immersive visualization based on movement of the user, wherein the parameters include at least one first tilt parameter that represents a tilt of lines of elements in an x dimension of the radial array from the viewpoint of the user and at least one second tilt parameter that represents a tilt of lines of elements in a y dimension of the radial array from the viewpoint of the user, and wherein initial values of the tilt parameters are set as non-zero values so that the user is not looking end-on directly down the lines of elements, wherein the parameters include a pitch parameter that represents a distance between adjacent elements of the radial array, wherein the pitch parameter is set as a characteristic of an original rectangular layout of the 3D data array, wherein the parameters further include a radius parameter that represents a distance between the user and the radial array, wherein a starting value of the radius parameter is set based on the pitch parameter, and wherein the starting value of the radius parameter is set to lead to a set of elements in the radial array being separated by a same distance as the pitch parameter.

10. A non-transitory computer-readable storage medium storing instructions that, when executed by at least one processor, cause the at least one processor to:
receive a three-dimensional (3D) data array defined in a 3D rectangular coordinate system, wherein the 3D data array includes a plurality of data records, wherein each of the data records includes a plurality of attributes, and wherein each of the three dimensions of the 3D data array represents one of the attributes of the data records;
transform the 3D data array including the plurality of data records with the plurality of attributes into a 3D radial array of multidimensional graphlets representing the 3D data array and defined in a non-rectangular coordinate system, wherein each of the three dimensions of the radial array represents one of the attributes of the data records, and wherein the radial array is defined by a plurality of parameters;
generate a 3D immersive visualization of the 3D radial array of multidimensional graphlets, wherein a user appears to be immersed within the radial array and the radial array appears to radiate from a viewpoint of the user; and
update the plurality of parameters and modify the 3D immersive visualization based on movement of the user of the visualization, wherein the parameters include at least one first tilt parameter that represents a tilt of lines of elements in an x dimension of the radial array from the viewpoint of the user and at least one second tilt parameter that represents a tilt of lines of elements in a y dimension of the radial array from the viewpoint of the user, wherein initial values of the tilt parameters are set as non-zero values so that the user is not looking end-on directly down the lines of elements, wherein the parameters include a pitch parameter that represents a distance between adjacent elements of the radial array, wherein the pitch parameter is set as a characteristic of an original rectangular layout of the 3D data array, wherein the parameters further include a radius parameter that represents a distance between the user and the radial array, and wherein a starting value of the radius parameter is set based on the pitch parameter, and wherein the starting value of the radius parameter is set to lead to a set of elements in the radial array being separated by a same distance as the pitch parameter.

11. The non-transitory computer-readable storage medium of claim 10, wherein each of the multidimensional graphlets includes at least three dimensions, and wherein attributes of data are represented with dimensions of the 3D radial array, and additional attributes of the data are represented with dimensions of the multidimensional graphlets.

* * * * *